(12) United States Patent
Kikumori (10) Patent No.: US 11,198,237 B2
(45) Date of Patent: Dec. 14, 2021

(54) INSERT MOLDING METHOD

(71) Applicant: OLYMPUS CORPORATION, Hachioji (JP)

(72) Inventor: Kazuhiro Kikumori, Nagano (JP)

(73) Assignee: OLYMPUS CORPORATION, Tokyo (JP)

( * ) Notice: Subject to any disclaimer, the term of this patent is extended or adjusted under 35 U.S.C. 154(b) by 360 days.

(21) Appl. No.: 16/190,086

(22) Filed: Nov. 13, 2018

(65) Prior Publication Data

US 2019/0077061 A1 Mar. 14, 2019

Related U.S. Application Data

(63) Continuation of application No. PCT/JP2017/015353, filed on Apr. 14, 2017.

(30) Foreign Application Priority Data

May 25, 2016 (JP) .............................. JP2016-104697

(51) Int. Cl.
*B29C 45/14* (2006.01)
*B29C 45/27* (2006.01)

(52) U.S. Cl.
CPC ........ *B29C 45/14311* (2013.01); *B29C 45/14* (2013.01); *B29C 45/14065* (2013.01);
(Continued)

(58) Field of Classification Search
None
See application file for complete search history.

(56) References Cited

U.S. PATENT DOCUMENTS 2,892,013 A * 6/1959 Gomberg .......... B29C 45/14385
174/153 G
3,551,956 A * 1/1971 Rosier ............... B29C 45/14065
425/129.1
(Continued)

FOREIGN PATENT DOCUMENTS

JP H09216254 A 8/1997
JP 2002280818 A 9/2002
(Continued)

OTHER PUBLICATIONS

Japanese Office Action dated Feb. 12, 2020 (and English translation thereof) issued in Japanese Application No. 2016-104697.
(Continued)

*Primary Examiner* — Edmund H Lee
(74) *Attorney, Agent, or Firm* — Holtz, Holtz & Volek PC (57) ABSTRACT

A disclosed insert molding method includes installing a first insert piece between a first mold and a second mold such that a smallest distance in a gap between the first insert piece and the first mold is smaller than a smallest distance in a gap between the first insert piece and the second mold, the first insert piece including a first through-hole of which width is larger than the smallest distance in the gap between the first insert piece and the first mold; and supplying a resin to a mold gap between the first insert piece and the first mold or the second mold, thereby to fill the mold gap with the resin, while the first insert piece and the first mold are kept to abut each other.

13 Claims, 13 Drawing Sheets

(52) U.S. Cl.
CPC .......... *B29C 45/27* (2013.01); *B29C 45/2708* (2013.01); *B29C 2045/14139* (2013.01); *B29C 2045/14327* (2013.01)

(56) References Cited

U.S. PATENT DOCUMENTS

| | | | | |
|---|---|---|---|---|
| 3,670,071 | A * | 6/1972 | Walchle | B29C 45/14 264/273 |
| 3,814,777 | A * | 6/1974 | Schmidt | B29C 45/14065 264/40.1 |
| 4,377,548 | A * | 3/1983 | Pierpont | B29C 70/72 264/265 |
| 4,470,786 | A * | 9/1984 | Sano | B29C 33/14 257/E21.504 |
| 4,702,873 | A * | 10/1987 | Kaczerginski | B29C 33/123 264/135 |
| 4,785,523 | A * | 11/1988 | Koseki | B23P 15/00 264/259 |
| 5,044,912 | A * | 9/1991 | Billings | B29C 45/14655 425/116 |
| 5,133,921 | A * | 7/1992 | Yokoyama | B29C 45/14073 257/E21.504 |
| 5,376,325 | A * | 12/1994 | Ormson | B29C 45/1671 264/254 |
| 5,766,985 | A * | 6/1998 | Mangiagli | B29C 45/14073 257/E21.504 |
| 5,842,265 | A * | 12/1998 | Rink | B29C 45/14221 29/460 |
| 5,935,502 | A * | 8/1999 | Ferri | B29C 45/14655 257/E21.504 |
| 6,309,579 | B1 * | 10/2001 | Koyama | B29C 45/14073 264/278 |
| 6,365,434 | B1 * | 4/2002 | Rumsey | H01L 21/565 257/E21.504 |
| 6,623,684 | B1 * | 9/2003 | Satoh | B29C 45/0025 264/259 |
| 6,630,911 | B2 | 10/2003 | Kamei et al. | |
| 6,639,557 | B2 | 10/2003 | Kamei et al. | |
| 6,951,626 | B2 * | 10/2005 | Akashi | A44B 17/0035 264/161 |
| 7,070,724 | B2 * | 7/2006 | Nakazawa | B29C 45/062 264/247 |
| 7,449,137 | B2 * | 11/2008 | Staargaard | B29C 45/14344 264/267 |
| 7,824,587 | B2 * | 11/2010 | Sato | B60R 13/0815 264/154 |
| 8,057,722 | B2 * | 11/2011 | Liang | H01H 13/88 264/273 |
| 8,070,993 | B2 * | 12/2011 | Keys | B29C 45/14073 264/40.4 |
| 8,313,681 | B2 * | 11/2012 | Watanabe | H01M 8/0286 264/273 |
| 2008/0160253 | A1 * | 7/2008 | Liu | B29C 45/14344 428/138 |
| 2011/0104583 | A1 | 5/2011 | Urakawa | |

FOREIGN PATENT DOCUMENTS

| | | |
|---|---|---|
| JP | 2003170467 A | 6/2003 |
| JP | 2009164286 A | 7/2009 |
| JP | 2010125822 A | 6/2010 |
| JP | 2011096545 A | 5/2011 |
| JP | 2011146350 A | 7/2011 |
| JP | 2012245692 A | 12/2012 |
| JP | 2015107608 A | 6/2015 |

OTHER PUBLICATIONS

International Search Report (ISR) dated Jun. 13, 2017 issued in International Application No. PCT/JP2017/015353.
Written Opinion dated Jun. 13, 2017 issued in International Application No. PCT/JP2017/015353.

* cited by examiner

INSERT MOLDING METHOD

CROSS-REFERENCE TO RELATED APPLICATION

This application is a continuation of PCT International Application No. PCT/JP2017/015353 filed on Apr. 14, 2017 which claims the benefit of priority from Japanese Patent Application No. 2016-104697, filed on May 25, 2016, the entire contents of which are incorporated herein by reference.

BACKGROUND

The present disclosure relates to an insert molding method.

In the past, there has been known insert molding in which an insert piece such as a metal insert is held by being sandwiched between molds, and a gap between the insert piece and the mold is filled with a resin, thereby to mold the insert piece and the resin into an integrated object. In such insert molding, deformation or positional deviation sometimes occur to the insert piece due to a pressure of the resin supplied, which makes it difficult to achieve a desired accuracy and functionality of an insert-molded object.

Japanese Laid-open Patent Publication No. 2003-170467 discloses a technology of holding an insert piece with a large number of pins on both the top and the bottom of the insert piece to prevent deformation and positional deviation of the insert piece during molding.

SUMMARY

The present disclosure has been made in view of the above and is directed to an improvement in an insert molding method.

According to an aspect of the present disclosure, an insert molding method is provided which includes installing a first insert piece between a first mold and a second mold such that a smallest distance in a gap between the first insert piece and the first mold is smaller than a smallest distance in a gap between the first insert piece and the second mold, the first insert piece including a first through-hole of which width is larger than the smallest distance in the gap between the first insert piece and the first mold; and supplying a resin to a mold gap between the first insert piece and the first mold or the second mold, thereby to fill the mold gap, while the first insert piece and the first mold are kept to abut each other.

The above and other features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

With reference to the drawings, explanations are given below to embodiments of an insert molding method according to the present disclosure. The present disclosure is not limited to the following embodiments, but generally applicable to various insert molding methods.

Furthermore, in drawings, the same or corresponding components are appropriately attached with the same reference numeral. Furthermore, it should be noted that the drawings are schematic and the relation between components in dimension, the ratio between components, and the like, sometimes differ from reality. Moreover, each of the drawings sometimes contains parts that are different in dimensional relationship and proportion.

First Embodiment

The insert molding method according to the first embodiment includes: an installation process for installing an insert piece in a mold; and a filling process for filling a gap between the mold and the insert piece with a resin.

Figure 1:
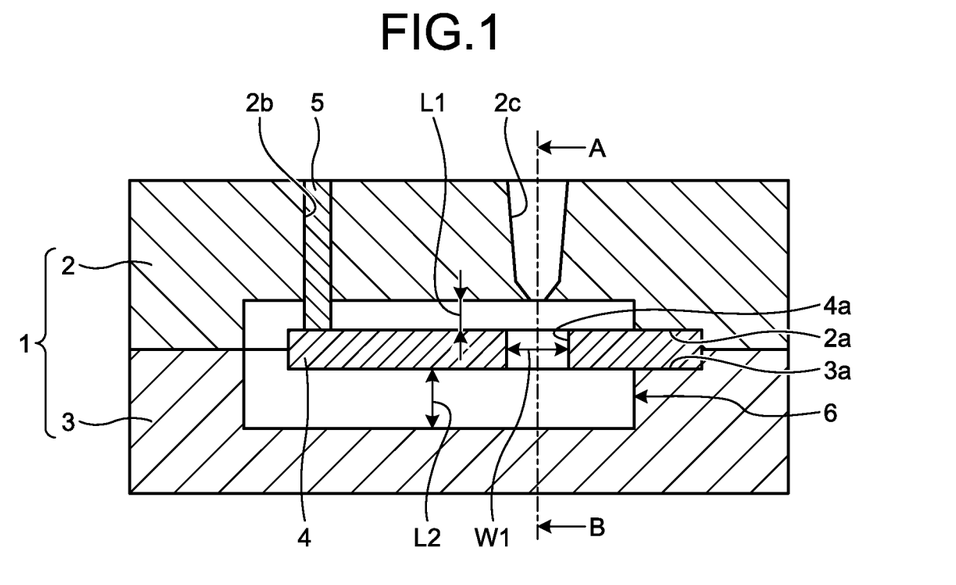
FIG. 1 is a cross-sectional view that schematically illustrates an insert-molding mold and an insert piece installed in the an insert-molding mold in an insert molding method according to a first embodiment.
Figure 2:
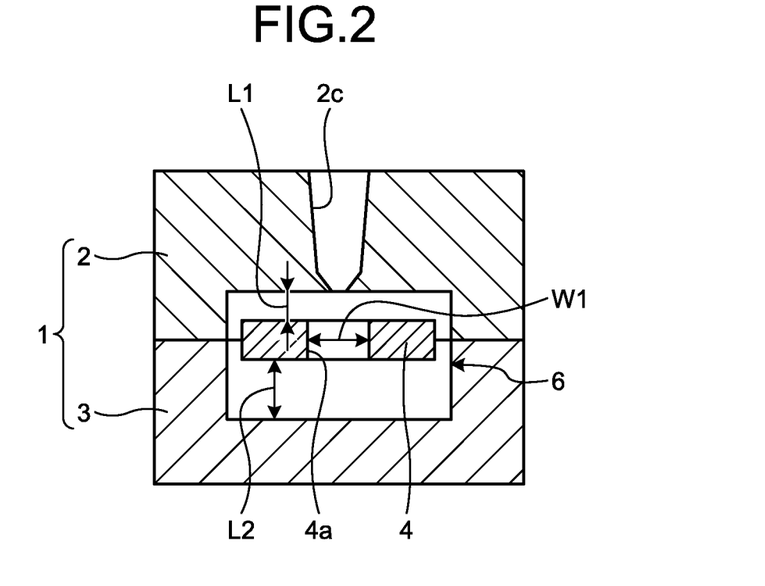
FIG. 2 is a cross-sectional view taken along a line A-B in FIG. 1.

FIG. 1 is a cross-sectional view illustrating an insert-molding mold and an insert piece installed in the insert-molding mold according to an insert molding method of the first embodiment. FIG. 2 is a cross-sectional view taken along a line A-B in FIG. 1.

First, a configuration of an insert-molding mold 1 is explained. The insert-molding mold 1 includes: a fixed mold 2 that is fixedly arranged, serving as a first mold; and a movable mold 3 that is movable, serving as a second mold. The fixed mold 2 is provided with a holding portion 2a that nips and holds an insert piece 4; a fixing portion 2b that is an opening for fixing an abutting member 5; and a gate 2c for filling a resin. The movable mold 3 is provided with a holding portion 3a that nips and holds the insert piece 4.

Next, configurations of the insert piece 4 and the abutting member 5 are explained. The insert piece 4 has a flat-plate like shape, and is provided with a first through-hole 4a having a cylindrical shape. The abutting member 5 is a cylindrical rod-like member, and is fixed to the fixing portion 2b of the fixed mold 2.

Next, the insert molding method according to the first embodiment is explained. First, in the installation process, the movable mold 3 is once removed, and then the insert piece 4 is installed between the fixed mold 2 and the movable mold 3. Here, a smallest distance L1 in a gap between the insert piece 4 and the fixed mold 2 is smaller than a smallest distance L2 in a gap between the insert piece 4 and the movable mold 3. Here, the smallest distance in the gap between two members, including the distance L1 and the distance L2, is a distance of the smallest gap between the insert piece 4 and the fixed mold 2 or the movable mold 3 in a plane perpendicular to a direction in which the resin supplied through the gate 2c flows, and the resin is less likely to flow as the distance is smaller. A distance described below in this specification refers to a distance that is defined in the same manner as the distance L1 and the distance L2.

Additionally, in the installation process, one end of the insert piece 4 is held by being sandwiched between the holding portion 2a of the fixed mold 2 and the holding portion 3a of the movable mold 3, and the other end of the insert piece 4 abuts the abutting member 5 protruding from the fixed mold 2. With this, the insert piece 4 is in indirect contact with the fixed mold 2 via the abutting member 5.

Furthermore, in the installation process, the first through-hole 4a of the insert piece 4 is arranged in a direction along which the gate 2c extends. A width W1 of the first through-hole 4a is larger than the distance L1.

Figure 3:
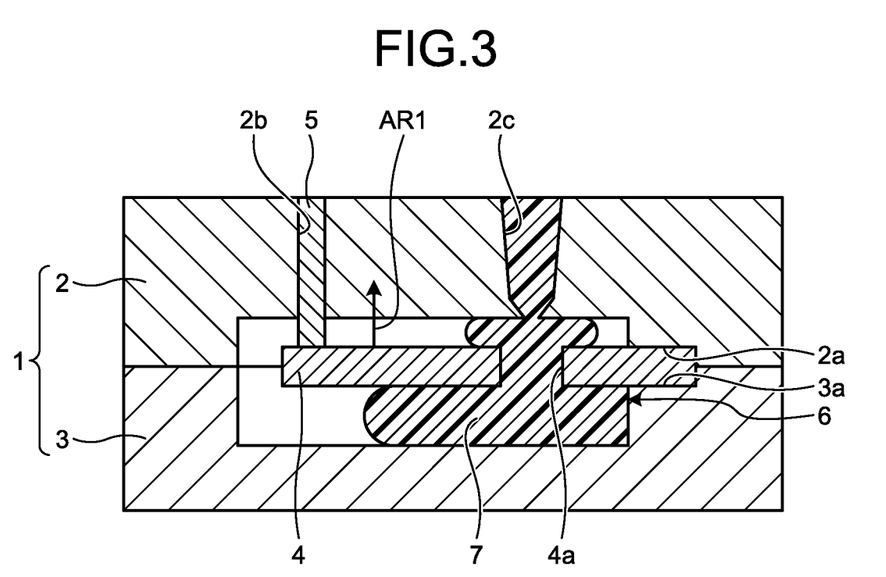
FIG. 3 is a diagram that schematically illustrates resin being filled in the insert-molding mold in the insert molding method according to the first embodiment.

FIG. 3 is a diagram that schematically illustrates resin being filled into a molding space 6 of the insert-molding mold 1, in the insert molding method according to the first embodiment. As illustrated in FIG. 3, in the filling process, the molding space 6, which is a space between the insert-molding mold 1 and the insert piece 4, is filled with a resin 7 from the gate 2c while the insert piece 4 continuously abuts the abutting member 5.

Here, because the width W1 and the distance L2 are larger than the distance L1, the resin 7 supplied from the gate 2c flows more likely into the gap between the insert piece 4 and the movable mold 3 than into the gap between the insert piece 4 and the fixed mold 2. Then, a pressure is applied to the insert piece 4 in a direction indicated by an arrow AR1 in FIG. 3 by the resin 7 flowing into the gap between the insert piece 4 and the movable mold 3. However, because the insert piece 4 abuts the abutting member 5, deformation and positional deviation of the insert piece 4 are prevented.

Then, after the resin 7 is hardened, the movable mold 3 is removed, and then a resultant integrally molded object is taken out from insert-molding mold 1. With this, a sequence of processes is completed.

In this way, according to the first embodiment, flow rates of the resin 7 around the insert piece 4 are differentiated by adjusting the distance L1, the distance L2, and the width W1 in the installation process, thereby to control a direction of force applied from the resin 7 to the insert piece 4. Furthermore, the abutting member 5 is provided to prevent deformation and positional deviation due to the force applied to the insert piece 4, whereby deformation and positional deviation of the insert piece 4 are prevented. Therefore, the insert molding method according to the first embodiment is favorable in that deformation and positional deviation of the insert piece 4 is prevented in insert molding even by using a mold with a simple configuration. Additionally, the insert molding method according to the first embodiment is favorable in that only a few marks of the abutting members 5 are left on the molded object, because the fewer number of the abutting members 5 is necessary, and thus an external appearance of the molded object is improved.

Modification 1-1

Figure 4:
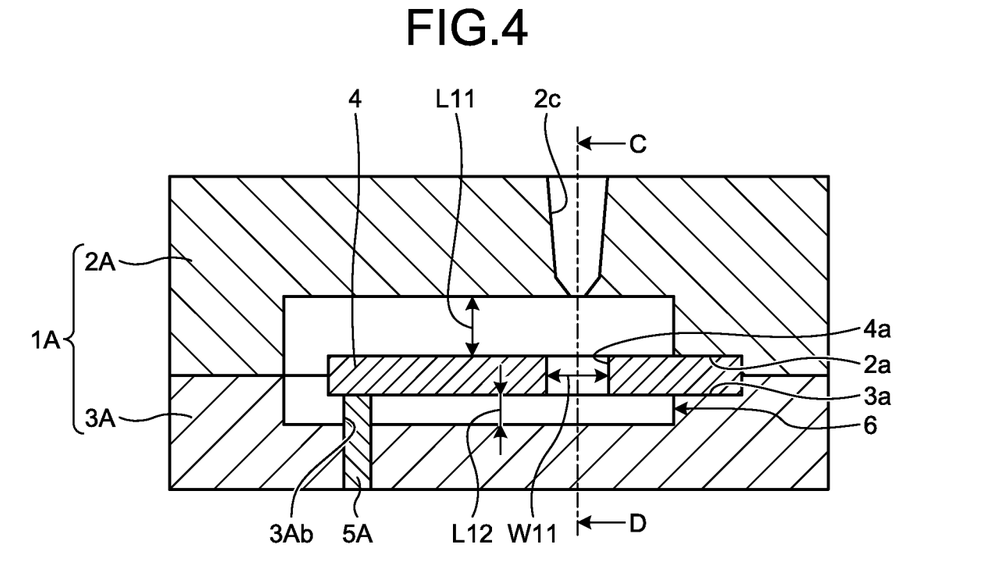
FIG. 4 is a cross-sectional view that schematically illustrates an insert-molding mold and an insert piece installed in the insert-molding mold according to an insert molding method of a modification 1-1 of the first embodiment.
Figure 5:
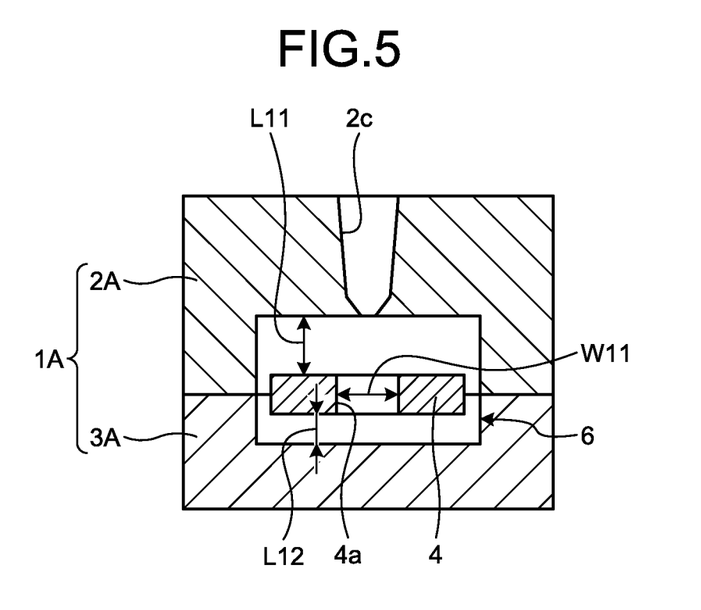
FIG. 5 is a cross-sectional view taken along a line C-D of FIG. 4.

FIG. 4 is a cross-sectional view illustrating an insert-molding mold and an insert piece installed in the insert-molding mold, according to an insert molding method of a modification 1-1 of the first embodiment. FIG. 5 is a cross-sectional view taken along a line C-D of FIG. 4. An insert-molding mold 1A includes: a fixed mold 2A serving as the second mold; and a movable mold 3A serving as the first mold. While the fixed mold 2A is not provided with any fixing portion, it is the movable mold 3A that is provided with a fixing portion 3Ab.

As illustrated in FIG. 4 and FIG. 5, in the installation process according to the modification 1-1, the insert piece 4 is installed such that a distance L12 is smaller than a width W11 and a distance L11. Furthermore, an abutting member 5A is fixed to the fixing portion 3Ab of the movable mold 3A.

Figure 6:
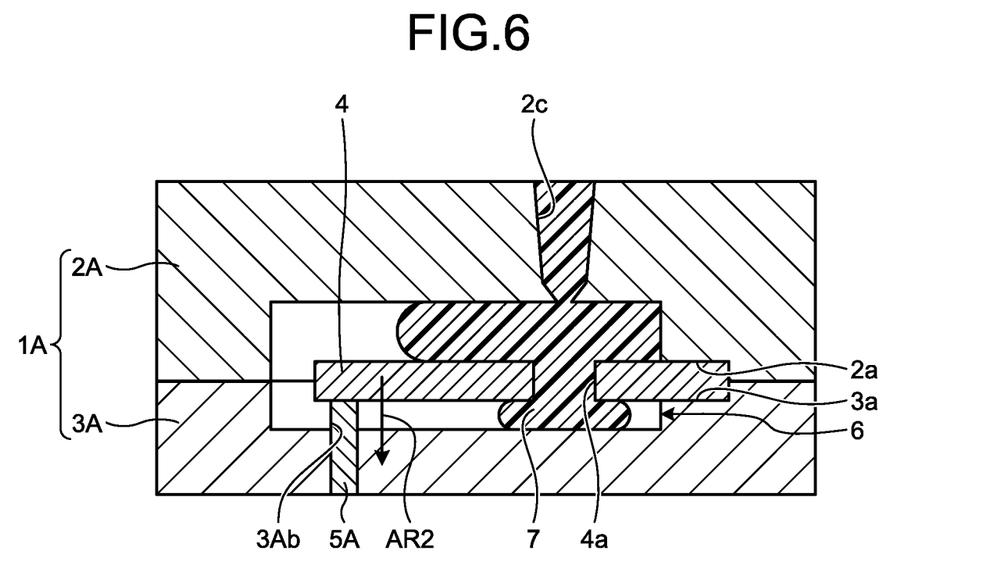
FIG. 6 is a diagram that schematically illustrates resin being filled in the insert-molding mold in the insert molding method according to the modification 1-1 of the first embodiment.

FIG. 6 is a diagram that schematically illustrates resin being filled into the molding space 6 of the insert-molding mold 1A, according to the insert molding method of the modification 1-1 of the first embodiment. As illustrated in FIG. 6, in the filling process, a pressure is applied to the insert piece 4 in a direction indicated by an arrow AR2 in FIG. 6 by the resin 7 flowing between the insert piece 4 and the fixed mold 2A, because the distance L12 is smaller than the width W11 and the distance L11 (FIG. 4). However, because the insert piece 4 abuts the abutting member 5A, deformation and positional deviation of the insert piece 4 are prevented.

In this way, when it is difficult to install an abutting member to the fixed mold 2A, the abutting member 5A may be provided to the movable mold 3A. Here, in order to apply the pressure due to the resin 7 greatly to the movable mold 3A where the abutting member 5A is installed, the distance L12 may be set smaller than the width W11 and the distance L11.

Modification 1-2

Figure 7:
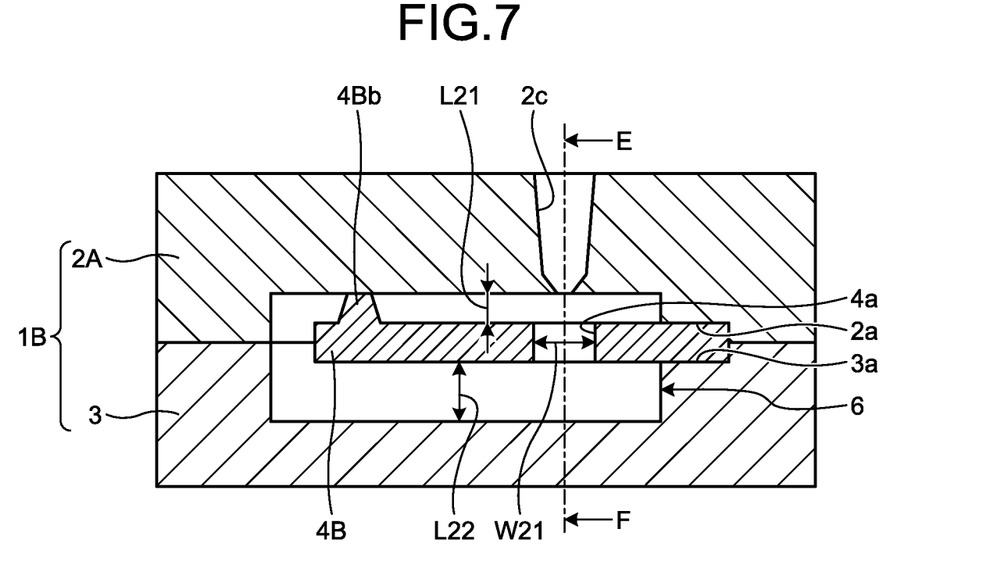
FIG. 7 is a cross-sectional view that schematically illustrates an insert-molding mold and an insert piece installed in the insert-molding mold in an insert molding method according to a modification 1-2 of the first embodiment.
Figure 8:
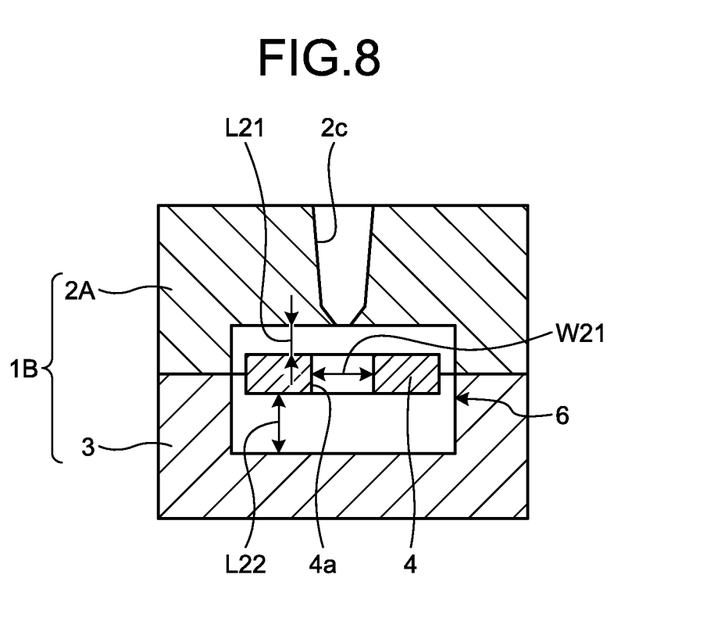
FIG. 8 is a cross-sectional view taken along a line E-F of FIG. 7.

FIG. 7 is a cross-sectional view that schematically illustrates an insert-molding mold and an insert piece installed in the insert-molding mold, according to an insert molding method of a modification 1-2 of the first embodiment. FIG. 8 is a cross-sectional view taken along a line E-F of FIG. 7. An insert-molding mold 1B includes: the fixed mold 2A that is provided with no fixing portion, serving as the first mold; and the movable mold 3 serving as the second mold. Neither the fixed mold 2A nor the movable mold 3 is provided with any fixing portion.

As illustrated in FIG. 7, in the installation process, as is the case with the first embodiment, an insert piece 4B is installed such that a distance L21 is smaller than a width W21 and a distance L22. Here, an abutting portion 4Bb of the insert piece 4B abuts the fixed mold 2A. In this way, instead of the abutting member 5 according to the first embodiment, the fixed mold 2A is abutted by the abutting portion 4Bb that is part of the insert piece 4B and serves as an abutting member.

Figure 9:
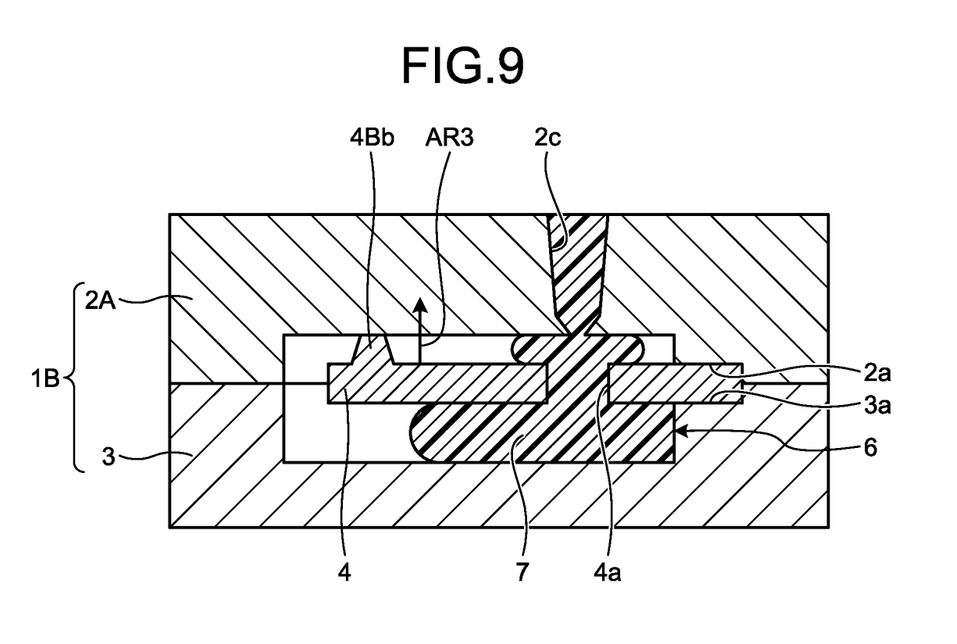
FIG. 9 is a diagram that schematically illustrates resin being filled in an insert-molding mold in an insert molding method according to the modification 1-2 of the first embodiment.

FIG. 9 is a diagram that schematically illustrates resin being filled into the molding space 6 of the insert-molding mold 1B according to the insert molding method of the modification 1-2 of the first embodiment. As illustrated in FIG. 9, in the filling process, because the distance L21 is smaller than the width W21 and the distance L22, a pressure is applied by the resin 7 to the insert piece 4B in a direction of an arrow AR3 in FIG. 9. However, because the abutting portion 4Bb of the insert piece 4B abuts the fixed mold 2A, deformation and positional deviation of the insert piece 4B are prevented.

In this way, when it is difficult to install an abutting member in the fixed mold 2A or the movable mold 3, part of the insert piece 4B may abut one of the fixed mold 2A and the movable mold 3, and the distance between the insert piece 4B and the one of the fixed mold 2A and the movable mold 3, the one being abutted by the insert piece 4B, may be smaller than the distance between the insert piece 4B and the other one of the fixed mold 2A and the movable mold 3.

Second Embodiment

Figure 10:
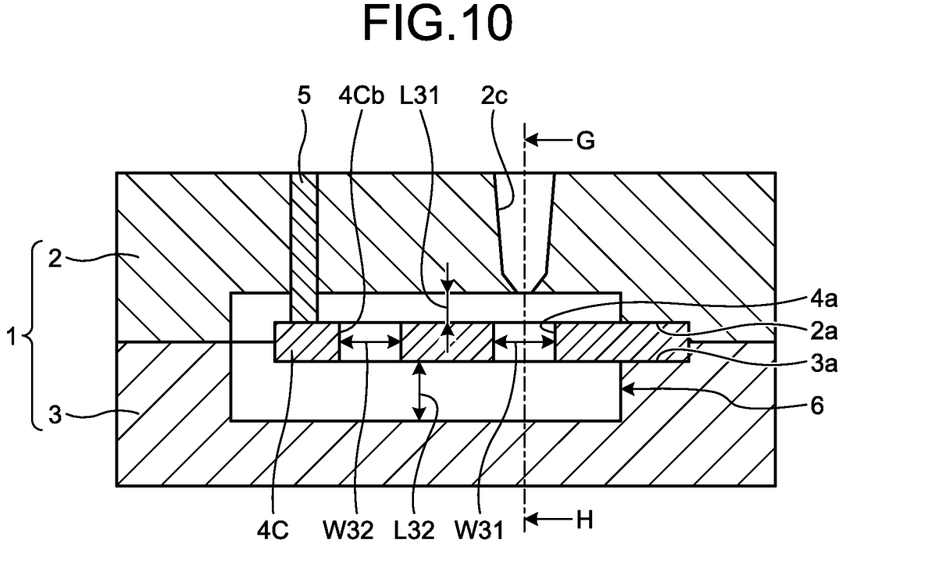
FIG. 10 is a cross-sectional view that schematically illustrates an insert-molding mold and an insert piece installed in the insert-molding mold in an insert molding method according to a second embodiment of the present disclosure.
Figure 11:
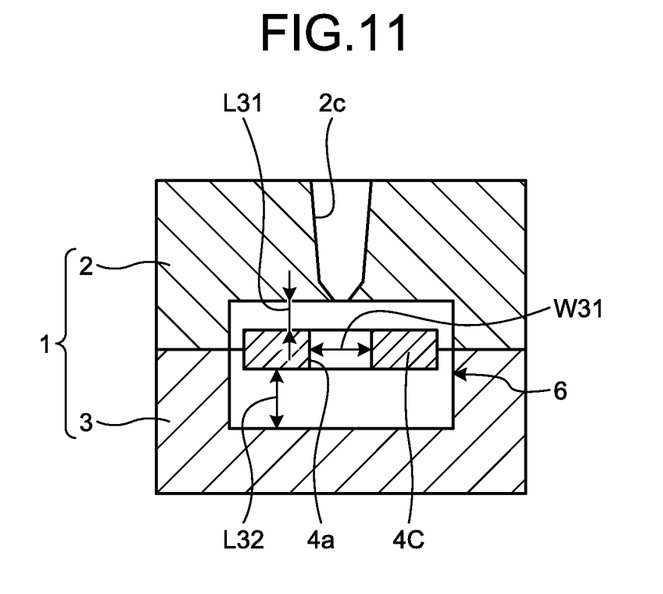
FIG. 11 is a cross-sectional view taken along a line G-H of FIG. 10.

FIG. 10 is a cross-sectional view illustrating an insert-molding mold and an insert piece installed in the insert-molding mold according to an insert molding method of a second embodiment of the present disclosure. FIG. 11 is a cross-sectional view taken along a line G-H of FIG. 10. As illustrated in FIG. 10 and FIG. 11, a second through-hole 4Cb of a cylindrical shape is formed in an insert piece 4C closer to the abutting member 5 than to the first through-hole 4a in the second embodiment. Because other structures are the same as those in the first embodiment, explanation is omitted as appropriate.

According to the second embodiment, in the installation process, as is the case with the first embodiment, the insert piece 4C is installed such that a distance L31 is smaller than a width W31 and a distance L32. Furthermore, a width W32 of the second through-hole 4Cb is larger than the distance L31 and is smaller than the distance L32.

Figure 12:
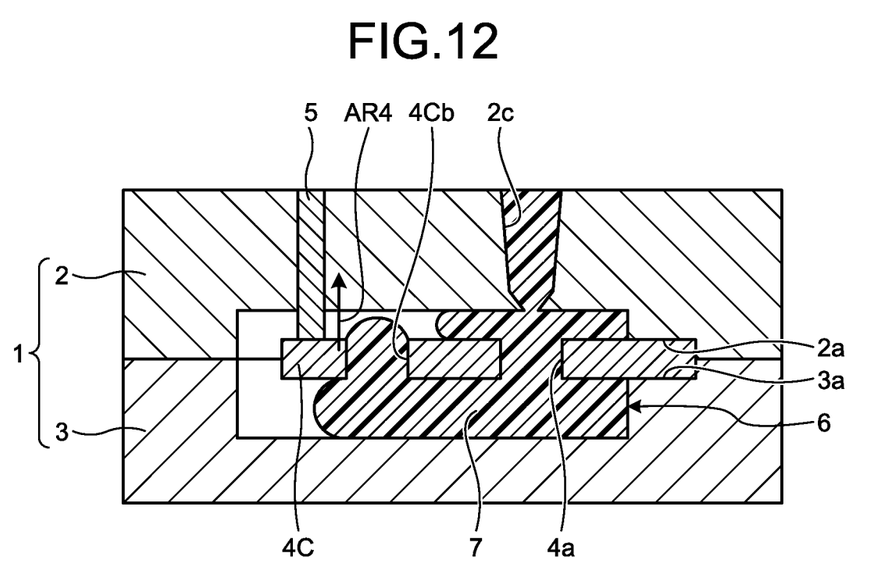
FIG. 12 is a diagram that schematically illustrates resin being filled in the insert-molding mold in the insert molding method according to the second embodiment of the present disclosure.

FIG. 12 is a diagram that schematically illustrates resin being filled into the molding space 6 according to the insert molding method of the second embodiment of the present disclosure. As illustrated in FIG. 12, in the filling process, because the distance L31 is smaller than the width W31 and the distance L32, a pressure is applied by the resin 7 to the insert piece 4C in a direction of an arrow AR4 in FIG. 12. However, because the insert piece 4C abuts the abutting member 5, deformation and positional deviation of the insert piece 4C are prevented.

Furthermore, in the filling process, because the second through-hole 4Cb is formed in the insert piece 4C, the resin 7 flows into a gap between the insert piece 4C and the fixed mold 2 from a gap between the insert piece 4C and the movable mold 3 through the second through-hole 4Cb. At this point, because force is applied by the resin 7 to the insert piece 4C in a direction of an arrow AR4 in FIG. 12 and the insert piece 4C abuts the abutting member 5, deformation and positional deviation of the insert piece 4C are prevented.

Furthermore, because the resin 7 flows into the gap between the insert piece 4C and the fixed mold 2 through the second through-hole 4Cb, areas (what is called, short shot) that are not filled with the resin 7 are effectively prevented to be formed even at the side of the fixed mold 2 where the distance L31 is small and the resin 7 is less likely to flow. Incidentally, with this configuration, two through-holes are formed in the insert piece 4C; however, three or more through-holes may be formed in an insert piece.

Modification 2-1

Figure 13:
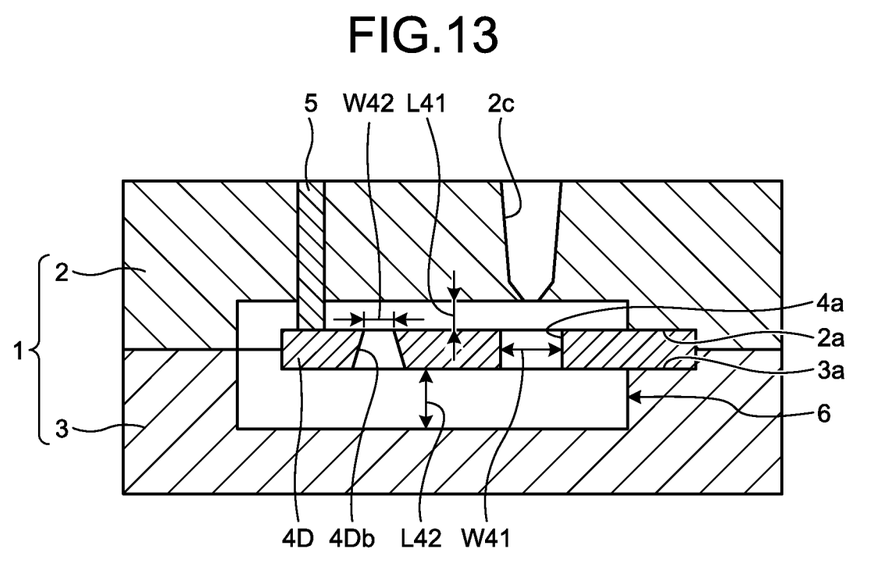
FIG. 13 is a cross-sectional view that schematically illustrates an insert-molding mold and an insert piece installed in the insert-molding mold in an insert molding method according to a modification 2-1 of the second embodiment.

FIG. 13 is a cross-sectional view that schematically illustrates an insert-molding mold and an insert piece installed in the insert-molding mold according to an insert molding method of a modification 2-1 of the second embodiment. As illustrated in FIG. 13, a second through-hole 4Db of an insert piece 4D may have a tapered shape such that its diameter gradually decreases in a direction from the movable mold 3 to the fixed mold 2. In the installation process according to the modification 2-1, the insert piece 4D is installed such that a distance L41 is smaller than a width W41 and a distance L42. Furthermore, a width W42 of the second through-hole 4Db at the position with the smallest diameter is larger than the distance L41 and is smaller than the distance L42. With this configuration, because the second through-hole 4Db has a tapered shape, a strong force is applied by the resin 7 toward the fixed mold 2 when the resin 7 flows into the side of the fixed mold 2 from the side of the movable mold 3 through the second through-hole 4Db. Such strong force allows the insert piece 4D to securely abut the abutting member 5, and therefore deformation and positional deviation of the insert piece 4D are prevented.

Modification 2-2

Figure 14:
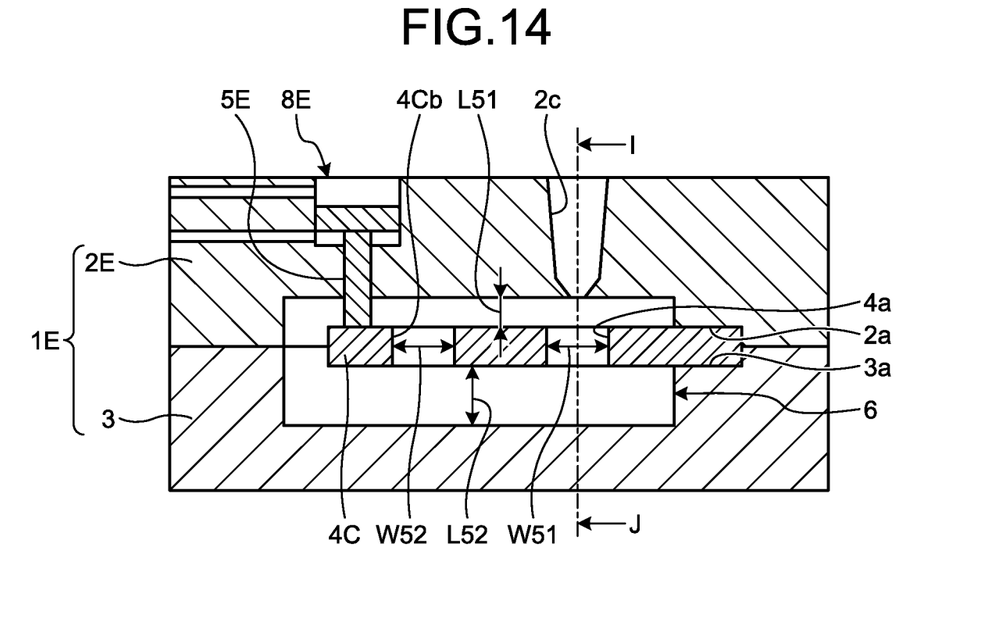
FIG. 14 is a cross-sectional view that schematically illustrates an insert-molding mold and an insert piece installed in the insert-molding mold in an insert molding method according to a modification 2-2 of the second embodiment.
Figure 15:
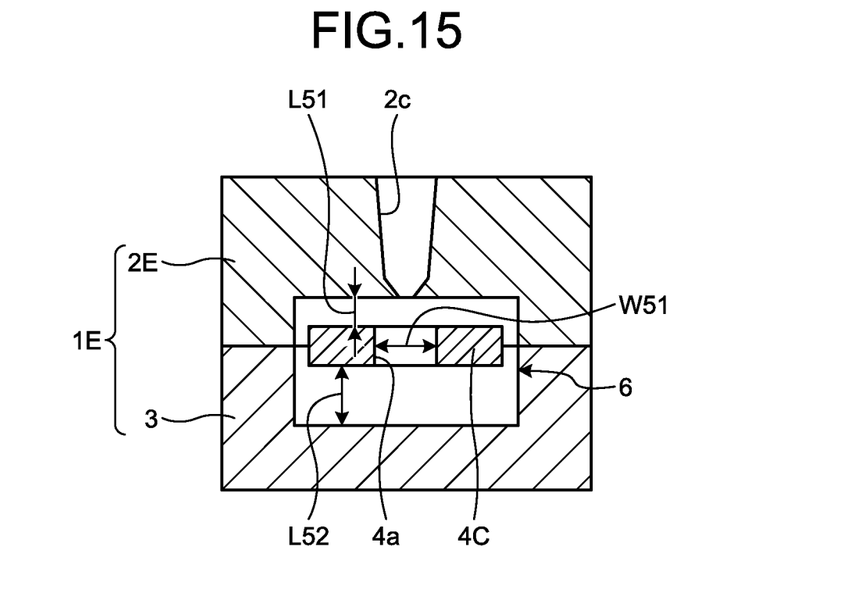
FIG. 15 is a cross-sectional view taken along a line I-J in FIG. 14.

FIG. 14 is a cross-sectional view that schematically illustrates an insert-molding mold and an insert piece installed in the insert-molding mold according to an insert molding method of a modification 2-2 of the second embodiment. FIG. 15 is a cross-sectional view taken along a line I-J in FIG. 14. A fixed mold 2E of an insert-molding mold 1E includes an air cylinder 8E. Furthermore, an abutting member 5E is attached to the air cylinder 8E.

In the installation process according to the modification 2-2, the insert piece 4C is installed such that a distance L51 is smaller than a width W51 and a distance L52. Furthermore, a width W52 of the second through-hole 4Cb is larger than the distance L51 and is smaller than the distance L52.

Figure 16:
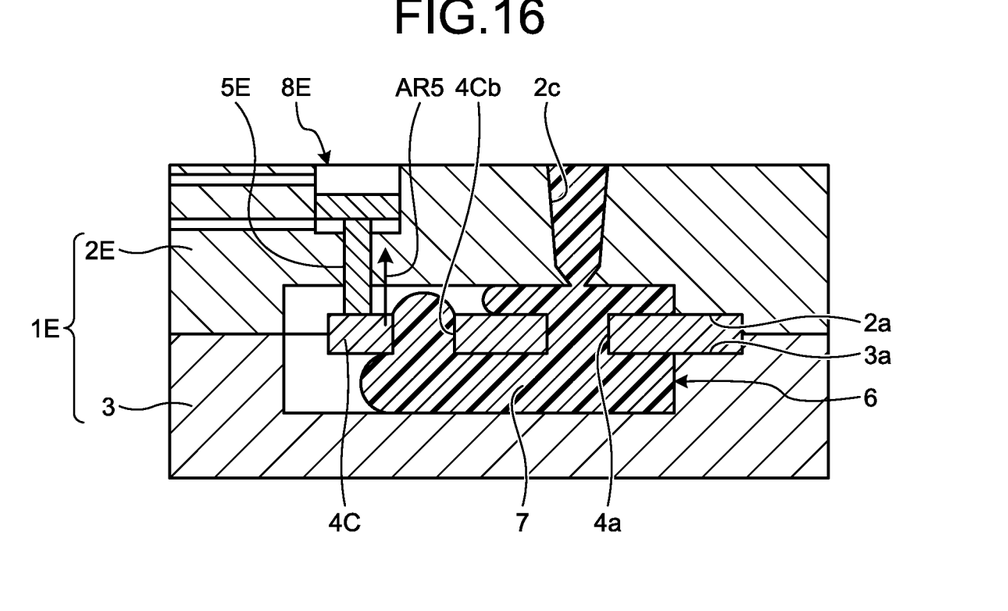
FIG. 16 is a diagram that schematically illustrates resin being filled in the insert-molding mold in an insert molding method according to the modification 2-2 of the second embodiment.

FIG. 16 is a diagram that schematically illustrates resin being filled into the molding space 6, according to an insert molding method of the modification 2-2 of the second embodiment. In the filling process, a pressure is applied to the air cylinder 8E to fill the inside of the cylinder with air so that the abutting member 5E is kept protruded from the fixed mold 2E. As illustrated in FIG. 16, in the filling process, because the distance L51 is smaller than the width W51 and the distance L52, the pressure is applied by the resin 7 to the insert piece 4C in a direction of an arrow AR5 in FIG. 16. However, because the insert piece 4C abuts the abutting member 5E, deformation and positional deviation of the insert piece 4C are prevented.

Furthermore, in the filling process, because the second through-hole 4Cb is formed in the insert piece 4C, the resin 7 flows into a gap between the insert piece 4C and the fixed mold 2E from a gap between the insert piece 40 and the movable mold 3 through the second through-hole 4Cb. At this point, force is applied by the resin 7 to the insert piece 4C in a direction of an arrow AR5 in FIG. 16, and the insert piece 4C abuts the abutting member 5E, whereby deformation and positional deviation of the insert piece 4C are prevented.

Figure 17:
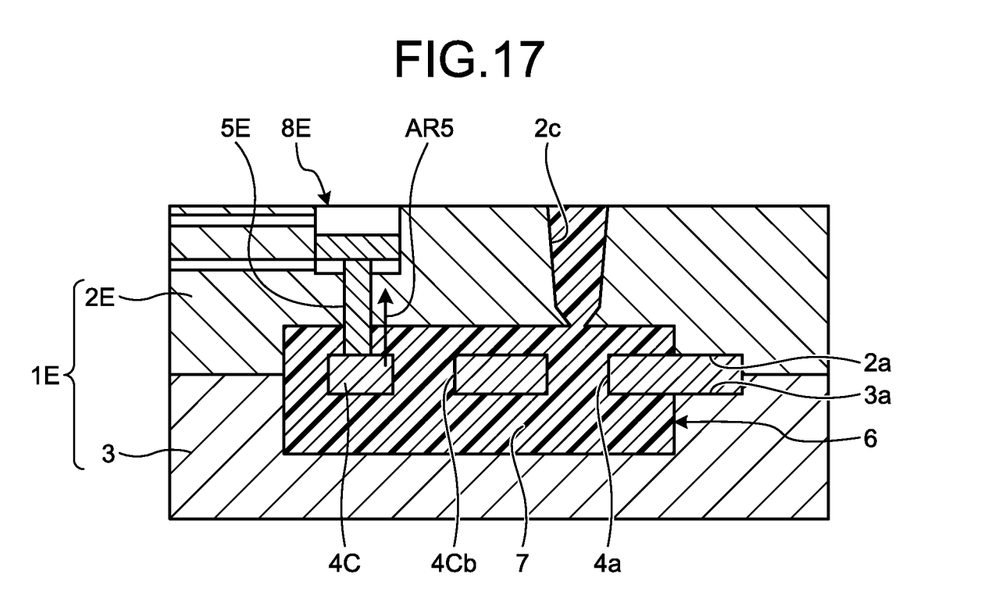
FIG. 17 is a diagram that schematically illustrates an abutting member being retracted in the insert molding method according to the modification 2-2 of the second embodiment.
Figure 18:
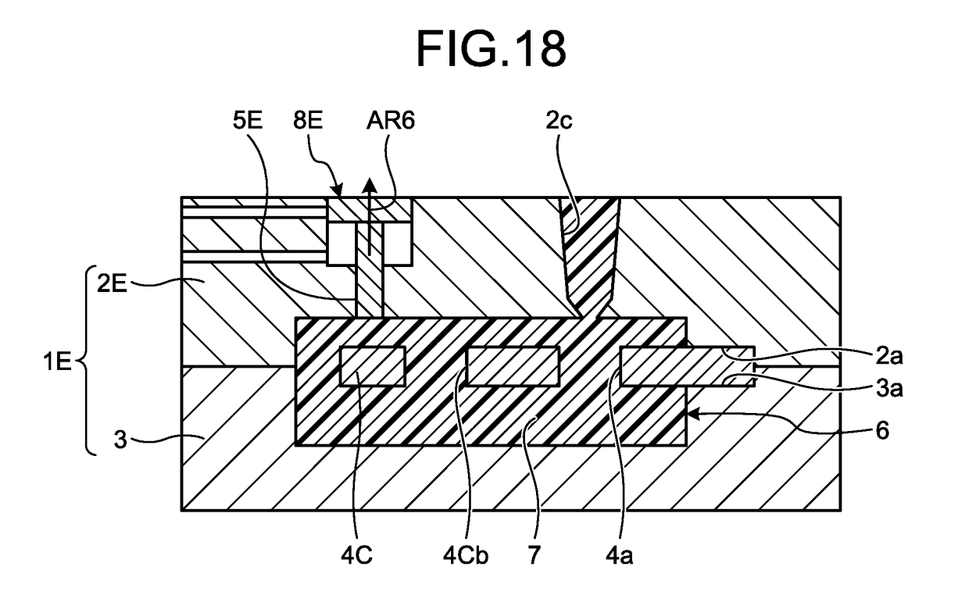
FIG. 18 is a diagram, subsequent to FIG. 17, which schematically illustrates the abutting member being retracted in the insert molding method according to the modification 2-2 of the second embodiment.

FIGS. 17 and 18 are diagrams that schematically illustrate the abutting member being retracted, according to the insert molding method of the modification 2-2 of the second embodiment. As illustrated in FIG. 17, immediately after filling of the resin 7 is completed and the filling process is terminated, the abutting member 5E is still protruded from the fixed mold 2E. Then, as illustrated in FIG. 18, the abutting member 5E is retracted to a position where it does not protrude from the fixed mold 2E while a pressure is continuously applied to inject the resin 7 through the gate 2c. Specifically, when the cylinder of the air cylinder 8E is no longer pressurized with air, the abutting member 5E is retracted due to the pressure of the resin 7 in a direction of an arrow AR6 in FIG. 18. As a result, according to the modification 2-2, because the abutting member 5E is retracted before the resin 7 is hardened, there is no remaining mark of the abutting member 5E on a molded object and the external appearance of a molded object is improved.

Here, the retracting process does not always need to be started immediately after filling of the resin 7 is completed. A retracting timing may be adjusted in consideration of an amount of the resin 7 filled into a molding space that is formed after the abutting member 5E is retracted, or a state of deformation of the insert piece 4C when the abutting member 5E is retracted.

Third Embodiment

Figure 19:
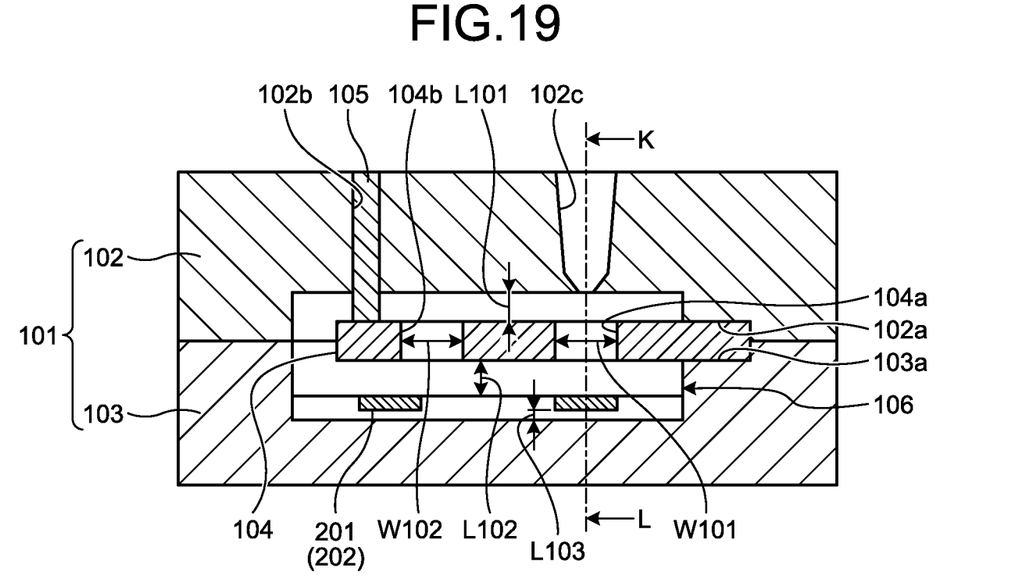
FIG. 19 is a cross-sectional view that schematically illustrates an insert-molding mold and an insert piece installed in the insert-molding mold in an insert molding method according to a third embodiment of the present disclosure.
Figure 20:
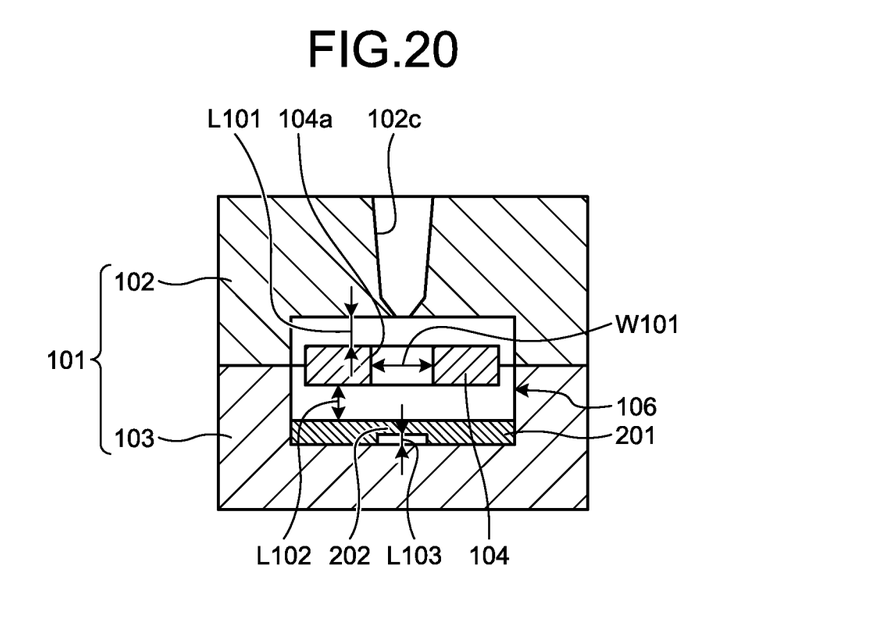
FIG. 20 is a cross-sectional view taken along a line K-L in FIG. 19.

FIG. 19 is a cross-sectional view that schematically illustrates an insert-molding mold and insert pieces installed in the insert-molding mold according to an insert molding method of a third embodiment of the present disclosure. FIG. 20 is a cross-sectional view taken along a line K-L in FIG. 19. As illustrated in FIG. 19, an insert-molding mold 101 includes: a fixed mold 102 serving as the first mold fixedly arranged; and a movable mold 103 serving as the second mold that is movable. The fixed mold 102 is provided with a holding portion 102a for nipping and holding a first insert piece 104; a fixing portion 102b that is an opening for fixing an abutting member 105; and a gate 102c for supplying a resin. The movable mold 103 is provided with a holding portion 103a for nipping and holding the first insert piece 104.

The first insert piece 104 has a flat-plate like shape, and is provided with a first through-hole 104a and a second through-hole 104b that are of a cylindrical shape. A second insert piece 201 is provided with a bridge portion 202 to form a space between the second insert piece 201 and the movable mold 103. The abutting member 105 is a cylindrical rod-like member, and fixed to the fixing portion 102b of the fixed mold 102.

In the installation process, the movable mold 103 is once removed, and then the first insert piece 104 and the second insert piece 201 are installed between the fixed mold 102 and the movable mold 103. Here, a smallest distance L101 in a gap between the first insert piece 104 and the fixed mold 102 is smaller than a smallest distance L102 in a gap between the first insert piece 104 and the second insert piece 201. Furthermore, a smallest distance L103 in a gap between the bridge portion 202 of the second insert piece 201 and the movable mold 103 is smaller than the distance L102.

Furthermore, in the installation process, the second insert piece 201 is placed on the movable mold 103, with the bridge portion 202 separated from the movable mold 103. Furthermore, one end of the first insert piece 104 is held by being sandwiched between the holding portion 102a of the fixed mold 102 and the holding portion 103a of the movable mold 103, and the other end of the first insert piece 104 abuts the abutting member 105 protruding from the fixed mold 102.

Furthermore, in the installation process, the first through-hole 104a of the first insert piece 104 is arranged in a direction in which the gate 102c extends. A width W101 of the first through-hole 104a is larger than the distance L101. Furthermore, a width W102 of the second through-hole 104b is larger than the distance L101 and is smaller than the distance L102.

Figure 21:
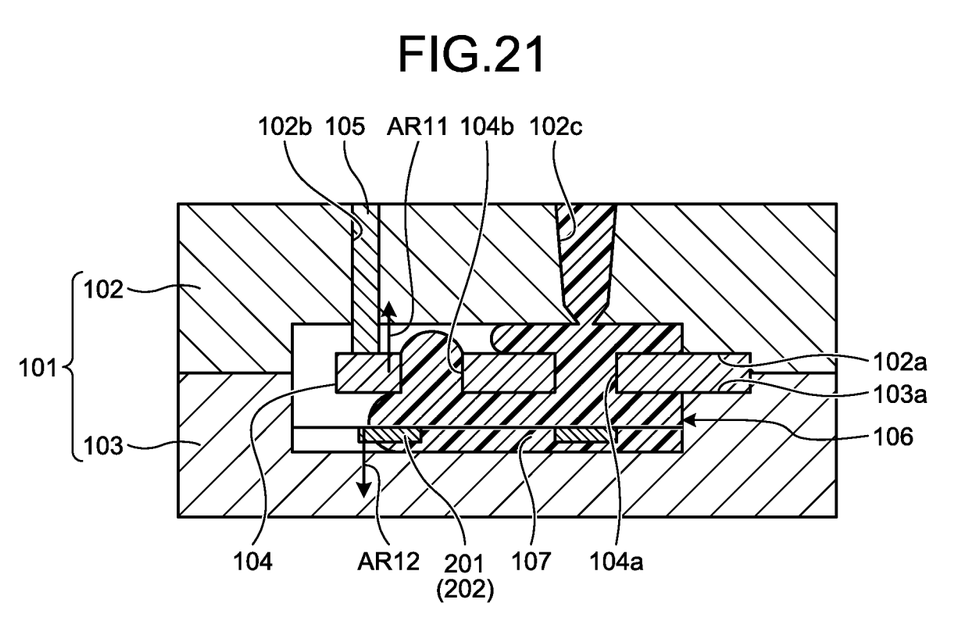
FIG. 21 is a diagram that schematically illustrates resin being filled in the insert molding method according to the third embodiment of the present disclosure.

FIG. 21 is a diagram that schematically illustrates resin being filled into a molding space 106, according to the insert molding method of the third embodiment of the present disclosure. As illustrated in FIG. 21, in the filling process, the molding space 106, which is a space between the insert-molding mold 101 and the first insert piece 104 or the second insert piece 201, is filled with a resin 107 through the gate 102c while the first insert piece 104 is kept to abut the abutting member 105 and the second insert piece 201 is kept to abut the movable mold 103.

Here, because the width W101 and the distance L102 are larger than the distance L101, the resin 107 supplied through the gate 102c flows more likely into the gap between the first insert piece 104 and the second insert piece 201 than into a gap between the first insert piece 104 and the fixed mold 102. Then, a pressure is applied by the resin 107 to the first insert piece 104 in a direction of an arrow AR11 in FIG. 21. However, because the first insert piece 104 abuts the abutting member 105, deformation and positional deviation of the first insert piece 104 are prevented.

Furthermore, because the second through-hole 104b is formed in the first insert piece 104, the resin 107 flows into the gap between the first insert piece 104 and the fixed mold 102 from the gap between the first insert piece 104 and the second insert piece 201 through the second through-hole 104b. At this point, force is applied by the resin 107 to the first insert piece 104 in a direction of the arrow AR11 in FIG. 21, which allows the first insert piece 104 to securely abut the abutting member 105, whereby deformation and positional deviation of the first insert piece 104 are prevented.

Furthermore, because the distance L102 is larger than the distance L103, the resin 107 supplied through the gate 102c flows more likely into the gap between the first insert piece 104 and the second insert piece 201 than into the gap between the second insert piece 201 and the movable mold 103. Then, a pressure is applied by the resin 107 to the second insert piece 201 in a direction of an arrow AR12 in FIG. 21. However, because the second insert piece 201 abuts the movable mold 103, deformation and positional deviation of the second insert piece 201 are prevented.

Incidentally, in the third embodiment, the abutting member 105 may be attached to the air cylinder 8E described in the modification 2-2 so that the retracting process is conducted, whereby no mark of the abutting member 105 remains on a molded object.

According to the present disclosure, it is possible to implement an insert molding method that is capable of preventing deformation and positional deviation of an insert piece in insert molding even by using a mold having a simple structure.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An insert molding method comprising:
    installing an insert piece in a molding space between a first mold and a second mold such that (i) only a first end of the insert piece is held by being sandwiched between the first mold and the second mold, (ii) a second end of the insert piece opposite from the first end is not held by being sandwiched between the first mold and the second mold, and (iii) the second end of the insert piece abuts an abutting member that protrudes from the first mold, wherein the insert piece is installed such that a first gap exists between the insert piece and the first mold and a second gap exists between the insert piece and the second mold, wherein a smallest distance from the insert piece to the first mold in the first gap is less than a smallest distance from the insert piece to the second mold in the second gap, and wherein the insert piece includes a first through hole having a width that is larger than the smallest distance from the insert piece to the first mold in the first gap; and
    supplying a resin to the first gap between the insert piece and the first mold, and supplying the resin through the first through hole to the second gap between the insert piece and second mold, to fill the molding space between the first and second molds with the resin, while the first end of the insert piece is held by being sandwiched between the first mold and the second mold and the second end of the insert piece abuts the abutting member that protrudes from the first mold.

2. The insert molding method according to claim 1, wherein the first mold includes a gate that allows the resin to be supplied therethrough, and the installing includes arranging the first through-hole of the insert piece to directly face and oppose the gate along a direction in which the gate extends.

3. The insert molding method according to claim 2, wherein the insert piece includes a second through-hole, and a width of a second through-hole larger than the smallest distance from the insert piece to the first mold in the first gap and is smaller than the smallest distance from the insert piece to the second mold in the second gap.

4. The insert molding method according to claim 3, wherein the second through-hole is arranged closer to the abutting member than to the first through-hole.

5. The insert molding method according to claim 1, further comprising retracting the abutting member to a position where the abutting member does not protrude from the first mold while a pressure to supply the resin is continuously applied after the filling.

6. The insert molding method according to claim 1, wherein the second mold includes a gate that allows the resin to be supplied therethrough, and the installing includes arranging the first through-hole of the insert piece to directly face and oppose the gate along a direction in which the gate extends.

7. The insert molding method according to claim 6, wherein the insert piece includes a second through-hole, and a width of a second through-hole larger than the smallest distance from the insert piece to the first mold in the first gap and is smaller than the smallest distance from the insert piece to the second mold in the second gap.

8. The insert molding method according to claim 7, wherein the second through-hole is arranged closer to the abutting member than to the first through-hole.

9. The insert molding method according to claim 7, wherein the second through-hole is tapered.

10. The insert molding method according to claim 9, wherein a smallest width of the tapered second through-hole is larger than the smallest distance from the insert piece to the first mold in the first gap and is smaller than the smallest distance from the insert piece to the second mold in the second gap.

11. An insert molding method comprising:
    installing a first insert piece in a molding space between a first mold and a second mold and installing a second insert piece between the first insert piece and the second mold such that the second insert piece abuts the second mold, wherein the second insert piece includes a bridge portion that is separated from the second mold when the second insert piece abuts the second mold, wherein the first insert piece and the second insert piece are installed such that a first gap exists between the first insert piece and the first mold, a second gap exists between the first insert piece and the second insert piece, and a third gap exists between the bridge portion of the second insert piece and the second mold, wherein a smallest distance from the first insert piece to the first mold in the first gap is smaller than a smallest distance from the first insert piece to the second insert piece in the second gap, wherein a smallest distance from the second mold to the bridge portion in the third gap is smaller than the smallest distance from the first insert piece to the second insert piece in the second gap, and wherein the first insert piece includes a first through hole having a width that is larger than the smallest distance from the insert piece to the first mold in the first gap; and
    supplying a resin to the first gap between the first insert piece and the first mold to fill the molding space between the first and second molds with the resin.

12. The insert molding method according to claim 3, wherein the second through-hole is tapered.

13. The insert molding method according to claim 12, wherein a smallest width of the tapered second through-hole is larger than the smallest distance from the insert piece to the first mold in the first gap and is smaller than the smallest distance from the insert piece to the second mold in the second gap.

* * * * *